United States Patent [19]
Fries

[11] 4,100,698
[45] Jul. 18, 1978

[54] PORTABLE GREENHOUSE

[76] Inventor: Christopher Fries, 61 Cromary Way, Inverness, Calif. 94937

[21] Appl. No.: 724,253

[22] Filed: Sep. 17, 1976

[51] Int. Cl.² ............................................. A01G 13/04
[52] U.S. Cl. ......................................................... 47/29
[58] Field of Search .................................... 47/26–30, 47/66, 73, 17

[56] References Cited

U.S. PATENT DOCUMENTS 2,691,848 10/1954 Arena ........................................ 47/26

FOREIGN PATENT DOCUMENTS

| 1,069,956 | 7/1954 | France | 47/29 |
| 1,195,461 | 11/1959 | France | 47/28 |
| 594,976 | 11/1947 | United Kingdom | 47/29 |
| 618,159 | 2/1949 | United Kingdom | 47/29 |

Primary Examiner—Robert E. Bagwill
Attorney, Agent, or Firm—Limbach, Limbach & Sutton

[57] ABSTRACT

A portable greenhouse has a light-transmitting roof section of a panel of synthetic resin which is foldable along a score line extending between the ends of the panel and also a pair of end panels attachable to the roof section adjacent the ends thereof to define the ends of the greenhouse.

14 Claims, 5 Drawing Figures

U.S. Patent
July 18, 1978
4,100,698
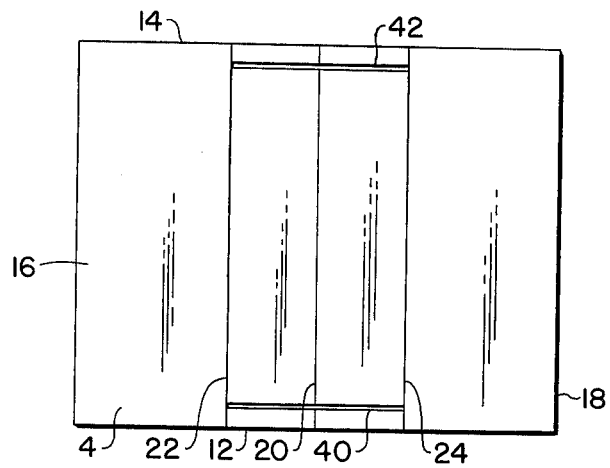
FIG._2.
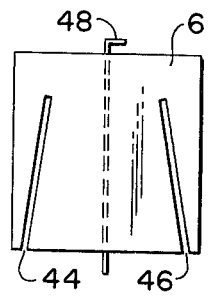
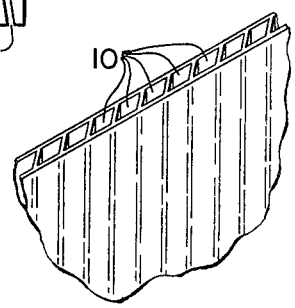
FIG._3.
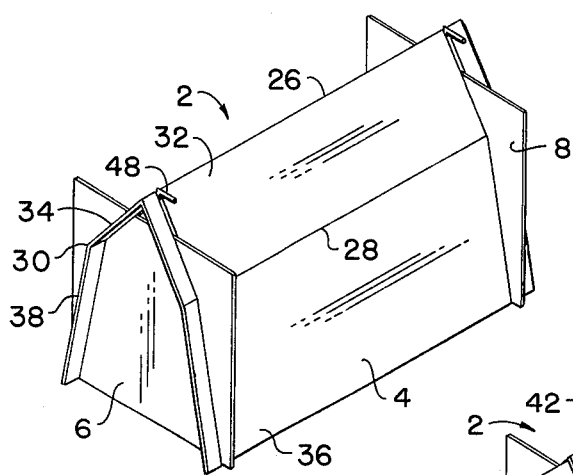
FIG._1.
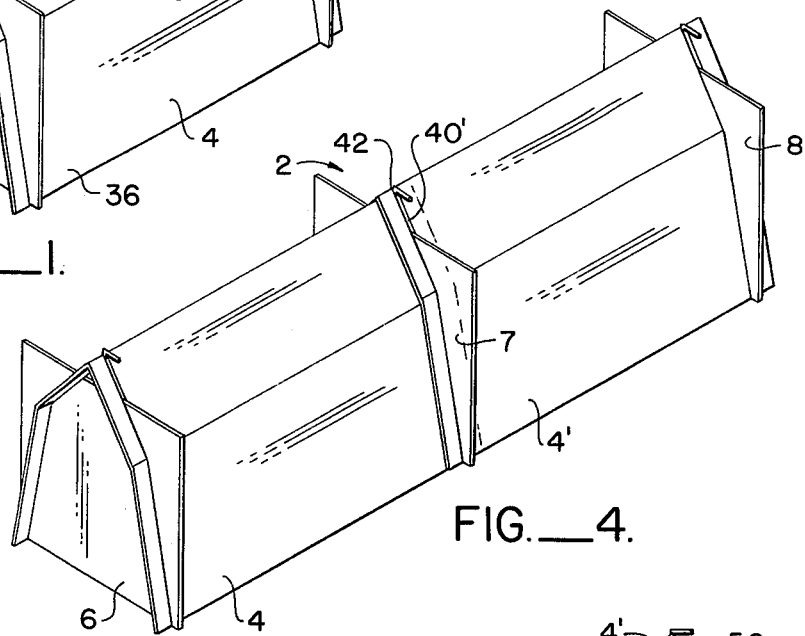
FIG._4.
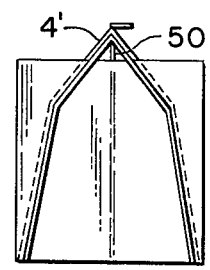
FIG._5.

PORTABLE GREENHOUSE

BACKGROUND OF THE INVENTION

In recent years there has been a great increase in the interest in the growing of both vegetables and house plants by the American public. This increase in interest has resulted from numerous factors, including the impact of inflation upon the cost of foods and the desire to have growing plants to beautify the home.

While some sections of the country are blessed with mild climates which facilitate year-round outdoor gardening without excessive hardship on the plants, many parts of the country are not so blessed. In many areas, particularly in the northern parts of the country, the effects of wind, rain, fog and cold both shorten the growing season and present significant additional stresses to plants so exposed. In conventional outdoor gardening such effects limit both the types of plants which may be grown and also the amount, due to the short growing season. Additionally, plants grown indoors frequently suffer from excessively dry warm air and radical fluctuations in temperature between day and night. This environment is particularly unhealthy for many plants which require warm, semi-tropical environments.

For both of the above situations there heretofore have been few satisfactory answers other than the construction of costly greenhouses or special greenhouse windows for homes. Particularly has this problem prevented the growing of plants in fixed beds outdoors.

SUMMARY OF THE INVENTION

In view of the foregoing problems it is an object of this invention to provide a portable greenhouse which is inexpensive and simple in design and assembly. It is a further object of this invention to provide such a greenhouse in which assembly requires only folding of a roof panel and attachment of a pair of end panels thereto. It is yet another object of this invention to provide such a greenhouse in which the structural panels are extruded, internally ribbed panels of synthetic resin.

Briefly, the portable greenhouse of this invention comprises a light-transmitting roof section of synthetic resin and a pair of end panels which are attachable to the ends of the roof section. The roof section further comprises a panel having opposed end edges and opposed lateral edges with at least one fold line extending between the end edges and disposed between the lateral edges. This roof panel is then foldable along the fold line to form the roof section.

In one preferred embodiment of the invention all of the panels are internally ribbed extrusions of polypropylene. The roof panel includes one slot adjacent each end thereof and extending transversely of the score line. One end panel, which is also slotted, is receivable through each roof slot and engages the sides of the roof section to maintain them in a predetermined folded configuration. In this embodiment, the predetermined configuration preferably is in the shape of a mansard roof.

BRIEF DESCRIPTION OF THE DRAWINGS

FIG. 1 is a pictorial view of a greenhouse according to this invention;

FIG. 2 is a plan view of the unfolded roof panel and one of the end panels that make up the greenhouse of FIG. 1;

FIG. 3 is an enlarged fragmentary view of a portion of the material from which the panels of the greenhouse of FIG. 1 are constructed;

FIG. 4 is an alternative embodiment of the greenhouse of this invention having a plurality of roof panels joined together;

FIG. 5 is an end elevation of the greenhouse of FIG. 4.

DESCRIPTION OF PREFERRED EMBODIMENTS

The greenhouse of this invention is illustrated in FIG. 1 and comprises generally a roof section 2 which is formed of a folded roof panel 4, and a pair of opposed end panels 6 and 8. Preferably, all of these panels are formed of an extruded, double-walled, internally ribbed synthetic resin panel material such as polypropylene, illustrated in FIG. 3. Due to this internally ribbed configuration, somewhat similar to that of corrugated cardboard, the panels may have very thin, light-weight plastic sections while retaining great stiffness and strength. Additionally, the air channels 10 formed by the internal ribbing provide for superior thermal insulation characteristics for the material. Preferably, the panels are translucent and incorporate an ultraviolet stabilizing ingredient to reduce degradation of the plastic by sunlight.

The panels from which the greenhouse of FIG. 1 is assembled are illustrated in FIG. 2. Since end panels 6 and 8 are substantially identical in configuration, only one of the panels 6 is illustrated. The roof panel 4 is defined by opposed end edges 12 and 14 and opposed lateral edges 16 and 18. A central score line 20 extending between the end edges 12 and 14 is disposed generally centrally of the lateral edges 16 and 18 and defines a fold line, preferably bisecting the panel 4. A pair of intermediate score lines 22 and 24 also extend between edges 12 and 14 and are positioned on either side of and generally parallel to the central score line 20 and define additional fold lines. The central score line 20 facilitates folding of the panel 4 to form the peak or ridge 26 of the roof section 2. Similarly, the intermediate score lines 22 and 24 facilitate the additional folds 28 and 30 illustrated in FIG. 1. By folding the roof panel 4 along these three score lines, the panel may be formed into a shape resembling a mansard roof as illustrated in FIG. 1. In this configuration the roof section thus comprises a pair of upper roof portions 32 and 34 and a pair of side portions 36 and 38.

Adjacent each end of the roof panel are the respective slots 40 and 42 which extend transversely of the central score or fold line 20 and preferably between the intermediate score or fold lines 22 and 24. These slots extend completely through the panel 4 and preferably are of about the same width as the thickness of the panel material, about 3/16 inch.

End panel 6 suitably comprises a rectangular panel of the polypropylene extrusion that is dimensioned to be of slightly less height in the vertical direction than the peak or ridge 26 of the roof section when erected, for purposes to be described below. Each of these end panels includes a pair of slots 44 and 46 extending from the bottom edge partway to the top. These slots preferably are of about ⅜ inch width, or about twice the thickness of the roof panel 4. Preferably, each of these end panels includes an anchoring stake 48, suitably of galvanized steel rod, inserted between a pair of adjacent internal ribs of the end of panel. The diameter of the anchoring stake 48 is desirably such that it will provide an interference fit within the channel provided by those adjacent ribs to retain the stake frictionally in place.

The assembly of the greenhouse of this invention is illustrated in FIG. 1 and is achieved by first folding roof panel 4 along fold lines 20, 22 and 24 into the mansard roof shape illustrated. Then the bottoms of the ends panels 6 and 8 are inserted through the respective slots 40 and 42, and the side portions 36 and 38 of the roof section 2 are aligned to engage slots 44 and 46 in the end panels. At that point, the end panels 6 and 8 are slid into the position illustrated in FIG. 1, with the roof section 2 maintained in its configuration by the straddled engagement of the side portions 36 with the slots 44 and 46 in the end panels 6 and 8.

While the roof section is illustrated in FIG. 1 in the preferred configurations of a mansard roof, obviously configurations such as a triangular section A-frame with only a central fold or score line, or a wedge-shape, or numerous other configurations within the scope of the invention could be employed equally suitably. Similarly, while the end panels 6 and 8 are illustrated as being of slightly less height than the peak 26 of the roof section, such end panels could equally easily be dimensioned of equal or greater height than roof peak 26, and be only partially received through the slots 40 and 42. However, by having the end panels 6 and 8 of this slightly lesser height, a small ventilation gap at each end is provided between the top of the end panel and the peak 26 of the roof, a frequently desirable feature.

When the portable greenhouse of this invention is assembled as illustrated in FIG. 1, it is quite rigid and, due to its light weight, may easily be moved to any desired location. However, when used outdoors, this desirable light weight and portability requires anchoring of the structure to prevent any disturbance by winds. This anchoring is achieved by the insertion of anchor stakes 48 into the earth when the greenhouse is in place. These stakes anchor the end panels, which engage the roof section and thus anchor the entire greenhouse assembly.

Due to the simple construction of this greenhouse, with the use of only scored and slotted flat panels, the structure may easily be folded flat for storage when its use is not required. This foldability is further enhanced by the desirable usage of polypropylene material in fabricating the panels, since polypropylene may be folded repeatedly without fracturing or tearing, thus acting as a plastic hinge.

FIGS. 3 and 4 illustrate another embodiment of the greenhouse of this invention, elongated to accommodate more plants or a longer flower bed. In this embodiment the roof section comprises a plurality of roof panels (in this case two panels 4 and 4') overlappingly aligned along their score and fold lines. These adjacent roof panels preferably are overlappingly aligned with their adjacent slots (42 and 40') superimposed upon one another as illustrated in FIG. 4. Thus, an additional end panel 7, suitably identical to end panels 6 and 8, may be inserted through the superimposed slot into an engaging arrangement with both of the two adjacent roof panels. It is for this engagement of two such adjacent roof panels that the slots 44 and 46 in the end panels 6, 7 and 8 are desirably made the width equivalent to two thicknesses of the roof panel material. By this reception of additional end panel 7 through the superimposed slots and its engagement with the two adjacent roof panels, those two roof panels are effectively locked together to form a single elongated roof section 2. In a similar manner any number of roof panels may be locked together to form such portable greenhouses of extended lengths. As illustrated in FIG. 5, by appropriate selection of the height of the end panels as described above, a ventilation gap 50 may be provided along the entire length of any such elongated greenhouse and between the interior of the greenhouse and the exterior environment. Obviously, if the end panels were of a height greater than the maximum height of the greenhouse, the same effect could be obtained by providing an appropriately positioned and dimensioned hole through the panel.

While two particularly preferred embodiments of this invention have been described above in substantial detail, it is to be understood that the descriptions are only illustrative of the principles of the invention and are not to be considered limitative thereof. Since numerous variations and modifications of this greenhouse, all within the scope of the invention, will readily occur to those skilled in the art, the scope of this invention is to be limited solely by the claims appended hereto.

What is claimed is:

1. A portable greenhouse comprising
   a light-transmitting roof section comprising a roof panel of synthetic resin having opposed end edges and opposed lateral edges with at least one fold line extending between said end edges and disposed between said lateral edges, said roof panel being folded along said fold line to form said roof section having open ends, and
   a pair of end panels, one each removably attached to said roof section adjacent each said end edge thereof to at least partially close the ends of said greenhouse, portions of each said end panel being slotted to straddle portions of the adjacent said roof section.

2. A portable greenhouse according to claim 1 wherein said roof panel score line is disposed generally centrally of said lateral edges.

3. A portable greenhouse according to claim 2 wherein said roof panel further includes a pair of intermediate fold lines extending between said end edges and disposed on opposite sides of and generally parallel to said centrally disposed fold line, whereby the roof panel may be further folded along the fold lines to form upper roof portions between the opposed intermediate fold lines and side portions between the fold lines and the respectively adjacent lateral edges.

4. A portable greenhouse according to claim 3 wherein said roof section comprises said roof panel folded and maintained in the shape of a mansard roof.

5. A portable greenhouse according to claim 1 wherein said roof panel may selectively be erected for use or folded flat along said fold line for storage.

6. A portable greenhouse according to claim 1 wherein said roof panel includes one slot adjacent each said end edge, each said slot extending transversely of said fold line, and wherein each said end panel is at least partially receivable through one of said slots.

7. A portable greenhouse according to claim 6 wherein portions of said end panels are slotted to straddle portions of said roof panel adjacent the ends of said slots, whereby the straddling engagement between the end panels and the roof panel may serve to retain the roof panel in a predetermined folded configuration.

8. A portable greenhouse according to claim 1 wherein said roof and end panels comprise double walled panels of extruded, internally ribbed synthetic resin.

9. A portable greenhouse according to claim 8 wherein said panels are formed of polypropylene.

10. A portable greenhouse according to claim 1 wherein the height of said end panels is less than the height of said roof section, whereby, upon attachment of the end panels to the roof section, the top of the end panels may be spaced below the roof section such that a gap may remain between the top of the end panel and the top of the roof section to serve as a vent for the greenhouse.

11. A portable greenhouse according to claim 1 wherein said roof section comprises a plurality of said roof panels aligned longitudinally along said fold lines, a portion of one end of each said panel overlapping the adjacent said roof panel, and which further comprises an additional said end panel which is attachable to said overlapping portion of each said adjacent pair of said roof panels to join said roof panels together, whereby the end panels attachable to the outermost end edges of the longitudinally outermost said roof panels define the ends of the greenhouse.

12. A portable greenhouse according to claim 11 wherein each said roof panel includes a slot adjacent each said end edge, each said slot extending transversely of said fold line, and wherein one of said end panels is at least partially receivable through each said slot, whereby, when adjacent roof panels are overlappingly aligned with their adjacent slots superimposed, the reception of one of the additional end panels therethrough may serve to lock the adjacent roof panels together.

13. A portable greenhouse according to claim 1 further comprising anchor means connected to each end panel for selective insertion into the earth, whereby, upon such insertion of the anchor means the greenhouse may be anchored to the earth.

14. A portable greenhouse according to claim 13 wherein said anchor means comprises a stake connected to each said end panel, whereby the greenhouse may be anchored to the earth by insertion of the stakes into the earth.

* * * * *